United States Patent [19]

Kozma

[11] Patent Number: 5,021,463

[45] Date of Patent: Jun. 4, 1991

[54] METHOD FOR MAKING MULTICOLORED RESIN MATERIAL AND PRODUCT THEREOF

[75] Inventor: Matthew L. Kozma, Osterville, Mass.

[73] Assignee: Packaging Industries Group, Inc., Hyannis, Mass.

[21] Appl. No.: 208,106

[22] Filed: Jun. 17, 1988

[51] Int. Cl.⁵ .............................................. C08J 3/22
[52] U.S. Cl. ................................ 521/143; 521/145; 521/146; 521/149; 523/171; 523/346; 523/351
[58] Field of Search ............... 523/346, 351, 171; 521/920, 143, 145, 146, 149

[56] References Cited

U.S. PATENT DOCUMENTS

| | | | |
|---|---|---|---|
| 3,239,474 | 3/1966 | Cwik | 521/131 |
| 3,275,591 | 9/1966 | Tomlinson | 523/351 |
| 3,413,249 | 11/1968 | Luftglass et al. | 523/351 |
| 4,153,762 | 5/1979 | Lauterberg et al. | 521/920 |
| 4,510,271 | 4/1985 | Muhle et al. | 523/346 |
| 4,720,514 | 1/1988 | Needham | 523/351 |

FOREIGN PATENT DOCUMENTS

| | | | |
|---|---|---|---|
| 2520728 | 8/1983 | France | 523/171 |
| 30851 | 3/1976 | Japan | 523/351 |

Primary Examiner—John C. Bleutge
Assistant Examiner—David W. Woodward
Attorney, Agent, or Firm—Berman, Aisenberg & Platt

[57] ABSTRACT

A batch process for making a resin includes adding at least one portion of colored resin material to a resin base material of another color and mixing the combination including the colored material only sufficiently to incomplete blend the colored material into the base mix so that the colored material is only partially dispersed in the resin base. The multicolored product may be foamed or unfoamed material.

3 Claims, No Drawings under normal pressure decomposes the unreacted blowing agent. The crosslinking agent may be omitted for making a noncrosslinked foam. The blowing agent and blowing aid are omitted when making unfoamed material.

METHOD FOR MAKING MULTICOLORED RESIN MATERIAL AND PRODUCT THEREOF

FIELD OF THE INVENTION

The invention relates to a method for making multicolored patterned resin material and the product thereof

BACKGROUND OF THE INVENTION

Plastic resin products having a multicolored effect, such as stripes added or laminated to a resin material of a different color, are known. It is also known to produce solid colored resin material by adding colorant to a resin batch before mixing.

Japanese Patent No. 70-029,381 describes a foam polyolefin having a fine homogeneous closed-cell structure The foam is crosslinked, and is made by a batch process.

SUMMARY OF THE INVENTION

A batch process for making a multicolored resin material includes compounding the resin into a predetermined formulation, mixing the compounded resin, adding one or more colored material to a portion of mixed resin, further mixing the resin including the at least one colored material only sufficiently to incompletely blend the colored material into the resin and terminating the mixing when the colored material is only partially dispersed in the mixed resin, and foaming the incompletely blended resin. The colored material may be partially dispersed by calendering the resin several times, and the mixing step may be terminated, for example, when the colored material is blended into the resin sufficiently to form a marbled pattern in the foam. The colored material is preferably mixed with a portion of the resin before adding the colored material to the mixed resin. The product may, alternatively be foamed or unfoamed material.

It is a further object of the invention to provide a variegated multicolored resin material.

It is an object of the invention to provide a new process for partially dispersing colored material in a resin base.

DETAILED DESCRIPTION OF THE INVENTION

The method of the invention produces a fine-celled multicolored foam in which at least one colored material is only partially dispersed in the base resin. Pattern effects in the foam may be varied according to the amount of mixing of the colored material into the base resin, and patterns such as marbling may be produced. One or more coloring materials may be used. Any suitable resin material, such as polyethylene, polysytrene, EVA, or PVC, may be used. Unfoamed sheet material may also be made.

A suitable foamed material into which the coloring material may be introduced is a foamed polyolefin made by the process described in Japanese Patent No. 70-029381, That patent describes a method for making a polyolefin foam having a fine homogeneous closed-celled structure, produced in a batch process by heating a mixture of a polyolefin, a blowing agent, a blowing aid and a cross-linking agent in a mold under elevated pressure until 40 to 85 percent of the blowing agent remains unreacted. The pressure is reduced. Heating the prepared foam substance under normal pressure decomposes the unreacted blowing agent. The crosslinking agent may be omitted for making a noncrosslinked foam. The blowing agent and blowing aid are omitted when making unfoamed material.

The resin is made by weighing the materials to a predetermined formulation and mixing to provide a base resin having the required properties. The coloring materials which are preferably each mixed into a resin base, are formulated separately and individually. The basic resin formulation is heated and mixed in a batch process, and the material may be calendered several times through standard calender rolls. A portion of the heated resin is then removed and coloring materials added. During the last portion of the mixing cycle the portion of resin which has been colored is added to the mix, and only partially dispersed by incompletely blending the colored material into the base resin. Incorporation of the colored material is rapid. One or more portions containing coloring materials may be used. Alternatively, the resin, portion (s) to be colored may be separately formulated, heated, colored and added to the batch of base material. After adding the colored resin, the materials are then rapidly mixed and/or calendered until the required patterning is produced. A typical product has a marbled appearance, and each color is distinctly visible, although there may be some coloration blending, if desired. Either crosslinked or noncrosslinked material, which may be foamed or unfoamed, is made according to the required product.

EXAMPLE

Processing of Blue & White Swirl Crosslinked Polyethylene Foam Bun

1. Pre-weigh all ingredients for white (natural) 1.9 PCF XLPE foam.
2. Pre-weigh blue masterbatch (BASF Eupolein blue which is a Cu-phthalocyanin blue pigment dispersed in BASF A Wax - a low molecular weight polyethylene)
3. Pre-heat and prepare all equipment (internal mixer, two roll mill, presses, etc.) for processing.
4. Following the specified sequence, combine all ingredients for the 1.9 XLPE white (natural) foam bun using a Banbury type internal mixer.
5. Mix the material thoroughly and completely until hot (about 250 degrees F.) and pliable.
6. Remove 25% (by weight) of the batch from the mixer, keeping the material hot while weighing and transporting.
7. Using either a preheated second (smaller) internal mixer or a preheated two-roll mill, rapidly and completely disperse the blue masterbatch into the 25% of the white (natural) mixed material.
8. Remove the new pigmented 25% batch from the mixer or mill and prepare it as one or two long strips of pigmented hot material.
9. Return the new pigmented 25% of batch to the remaining 75% white (natural) material in the internal mixer.
10. Mix for 10 seconds permitting the 25% pigmented material to be incompletely dispersed in a swirling manner as in the normal flow pattern for material being mixed in an internal mixer.
11. Remove all material (white with blue swirls) from the mixer.
12. Pass the entire batch of material through a preheated two-roll mill once or twice to prepare a blank for the pressing operation.

13. Cut and weight to prepare blank size required for pressing/molding operation.

14. Cure and expand material in presses as is customarily done with the 1.9 XLPE white (natural) material. The product is white with blue swirls.

The base material may also be colored (as known in the art) instead of white and contrasting color, or colors, added according to the process of the invention.

Other proportions of colored and uncolored material may be used. For example, the mix may be 20% red, 25% blue and 55% white. Generally, not more than five colors are used, but the number of colors is not limited. In this example, in step 6 above, two portions, of 20% and 25% are taken from the batch, red pigment is mixed into the 20% portion, and blue pigment is mixed into the 25% portion. Both portions are added back into the remaining 55% of the batch. The product is white with red and blue swirls.

The marbled or otherwise variegated coloration may be obtained either in foamed or in unfoamed material. To use this technique in unfoamed material, a similar batch process, which eliminates the blowing agent and blowing aid from the formulation, and which eliminates the foaming step is used.

The decorative multicolored foamed material may be used for swim floats, exercise mats, shoe innersoles, or other uses. Multicolored unfoamed sheet material of the invention may be used, for example, as an outer decorative surface layer for sheet materials.

While the invention has been described above with respect to certain embodiments thereof, it will be appreciated that variations and modifications may be made without departing for the spirit and scope of the invention.

What is claimed is:

1. A batch process for making a multicolored foamed resin, comprising:
    compounding a base resin reselected from the group consisting of polyolefins, polystryrene, ethylene vinyl acetate and polyvinyl chloride to a predetermined pliable base resin formulation,
    adding coloring material to a portion of the pliable base resin formulation,
    mixing the base resin formulation and the portion having added coloring material only sufficiently to incompletely blend said coloring material into the base resin formulation so that the coloring material is partially dispersed in the base resin formulation,
    terminating the mixing step when the coloring material is only partially dispersed in the base resin formulation, whereby the separate colors of the base resin formulation and colored portion are each visible le, and the separate colors form a marbled pattern in the resin formulation,
    forming the incompletely blended resin formulation into resin material wherein separately colored portions form a marbled pattern, and
    forming the incompletely blended resin material to provided form a material wherein separately colored portions from a marbled pattern.

2. A process of claim 1 wherein the incomplete blending step comprises calendering the resin.

3. A process according to claim 1 further comprising dividing the pliable base resin formulation into a plurality of portions wherein a different coloring material is added to each portion, before mixing said portions until the coloring materials are incompletely blended in the resin formulation.

* * * * *